United States Patent
Silva et al.

(10) Patent No.: US 11,200,066 B2
(45) Date of Patent: Dec. 14, 2021

(54) SECURE DEVICE FOR BYPASSING OPERATING SYSTEM (OS) SECURITY

(71) Applicant: NCR Corporation, Duluth, GA (US)

(72) Inventors: Sergio Silva, Atlanta, GA (US); Mustafa Abdulelah, Atlanta, GA (US); Nicholas Caine, Cumming, GA (US); John Tatum Dyal, Acworth, GA (US); Andrew Klenzak, Atlanta, GA (US); Brian Patrick Rogers, Roswell, GA (US); Jeremy Cyle Taylor, Cumming, GA (US); Andrew John Wurfel, Smyrna, GA (US)

(73) Assignee: NCR Corporation, Atlanta, GA (US)

( * ) Notice: Subject to any disclaimer, the term of this patent is extended or adjusted under 35 U.S.C. 154(b) by 310 days.

(21) Appl. No.: 15/993,451

(22) Filed: May 30, 2018

(65) Prior Publication Data

US 2019/0370006 A1    Dec. 5, 2019

(51) Int. Cl.
*G06F 9/4401* (2018.01)
*G06F 21/31* (2013.01)

(52) U.S. Cl.
CPC .............. *G06F 9/441* (2013.01); *G06F 21/31* (2013.01)

(58) Field of Classification Search
CPC ... G06F 1/24; G06F 9/41; G06F 9/441; G06F 222/2129; G06F 21/31; G06F 21/575
See application file for complete search history.

(56) References Cited

U.S. PATENT DOCUMENTS

| | | | | |
|---|---|---|---|---|
| 6,922,722 B1* | 7/2005 | Mann | ...................... | H04L 67/34 709/217 |
| 8,868,898 B1* | 10/2014 | Van Hoof | ............. | G06F 21/575 713/2 |
| 2005/0273845 A1* | 12/2005 | Urano | ..................... | G06F 21/34 726/9 |
| 2012/0265976 A1* | 10/2012 | Spiers | ................. | G06F 9/45533 713/2 |
| 2015/0332050 A1* | 11/2015 | Garces-Erice | ........ | G06F 21/572 713/2 |
| 2016/0148597 A1* | 5/2016 | Hamid | .................... | G06F 21/31 345/173 |

* cited by examiner

*Primary Examiner* — Ashokkumar B Patel
*Assistant Examiner* — William B Jones
(74) *Attorney, Agent, or Firm* — NCR Corporation

(57) ABSTRACT

A portable device having a key is interfaced to a host computing device. The host computing device detects the key on the portable device and authenticates a user for using the key. A boot is forced of the host computing device and during the boot a customized image of an Operating System (OS) for the host computing device is loaded into volatile memory of the host computing device and customized security settings are applied to the OS based on a value of the key.

13 Claims, 4 Drawing Sheets

SECURE DEVICE FOR BYPASSING OPERATING SYSTEM (OS) SECURITY

BACKGROUND

When computing device or client-based terminal devices are deployed to sites, the sites inevitably apply a variety of customizations or modifications to the base and deployed OS image on the computing devices. Such modifications include, but are not limited to, security settings which prevent users from making system modifications or launching software on device startup which prevents the users from accessing the native OS platform. As functional requirements change at the sites or as system and software bugs are identified, the sites may need to access core OS functionality that is independent of their custom modifications.

While most devices permit booting into a safe mode, safe mode only disables startup applications and does not disable security features associated with the deployed OS image and does not disable many of the site modifications made to the OS. Furthermore, some OSs will disable some services of the OS when booted into safe mode. This is inconvenient and can be problematic to users when trying to debug an issue with the OS.

As a result, most site customers require an onsite technician to address problems that they experience with their modified and customized OS. This can create significant delays during which the device is offline and unavailable for use. Moreover, when the technician is able to fix the OS issues, some, if not all, of the site customizations may not be recoverable.

One such device where this is particularly problematic is an Automated Teller Machine (ATM), which a customer accesses to perform needed financial transactions. When the ATM is down, the customer will have to visit a different location to access a different ATM or obtain in-person teller assistance, assuming a branch with staffed tellers is open when the customer needs to perform a financial transaction. Offline ATMs that are unavailable for customer use creates customer dissatisfaction with the branch associated with the unavailable ATMs.

SUMMARY

In various embodiments, methods and a system for bypassing OS system security through a secure device are presented.

According to an embodiment, a method for bypassing OS system security through a secure device is presented. Specifically, and in one embodiment, a device is searched for a key during a boot of the device. Responsive to finding the key, selecting an image of an OS based on a presence of the key and loading the image of the OS with customized security settings into memory on the device based on the presence.

DETAILED DESCRIPTION

Figure 1:
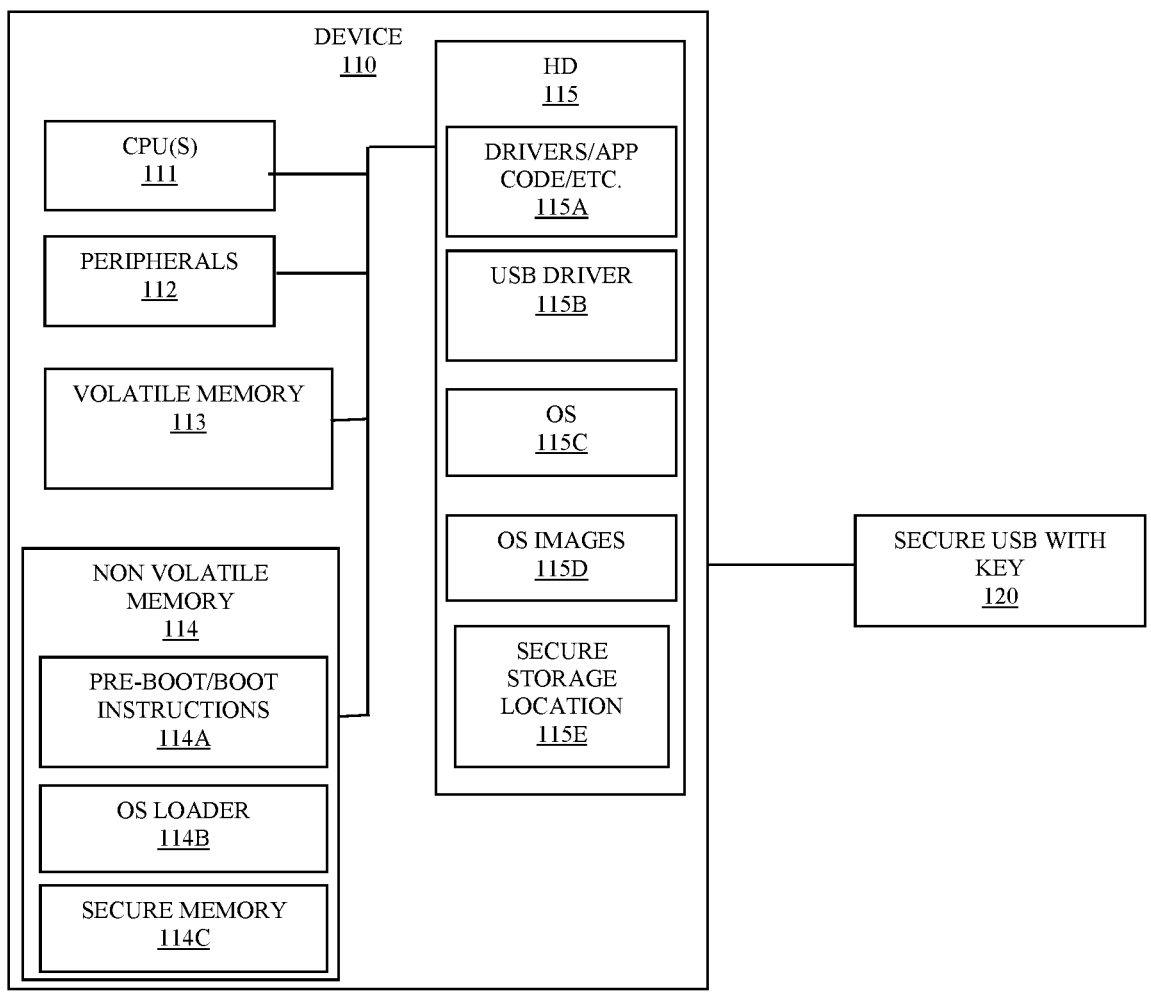
FIG. 1 is a diagram of a system for bypassing OS system security through a secure device, according to an example embodiment.

FIG. 1 is a diagram of a system 100 for bypassing OS system security through a secure device, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of bypassing OS system security through a secure device, presented herein and below.

The system 100 includes a device 110. The device 110 including: one or more central processing units (CPUs or processors) 111, peripheral devices 112, volatile memory 113, non-volatile memory 114, and a hard drive (HD) 115. The non-volatile memory 114 includes pre-boot/boot instructions 114A, a modified and novel OS loader 114B, and, optionally, a secure memory 114C. The HD 115 includes: peripheral drivers/application code 115A, a modified and novel Universal Serial Bus (USB) driver 115B, an OS code instance 115C, one or more OS image 115D, and, optionally, a secure storage location 115E.

In an embodiment, the HD 115 may further be encrypted and an additional secure storage location may include encryption/decryption keys.

The system 100 also includes a secure USB device having a security key 120.

Conventionally during a device boot or startup (power on), the pre-boot/boot instructions (which can include with some types of OSs a Binary Input/Output System (BIOS)) causes a conventional OS loader to load the OS from the HD into volatile memory and load the device driver/application code from the HD into volatile memory. The processors then execute the instructions for the OS, device drivers, and application code resulting in device initiation and availability for use.

The conventional device boot or startup is modified, as described below, when the secure USB device with the security key 120 is detected as being interfaced to the device 110. The USB device 120 can be interfaced during any state of the device 110 (when the device 110 is powered off and detected on device 110 boot or power up, or when the device 110 is in a normal operational state (not associated with any boot) and fully accessible to a user).

The USB driver 115B is called by the OS 115C when the OS detects the USB device 120 connected to a USB port of the device 110. The USB driver 115B scans the USB device 120 to detect the secure key resident on the USB device 120. If the secure key is not found no further action is taken and is an indication the inserted device is not the USB device 120.

Assuming, the USB driver 115B detects the secure key on the USB device 120, a small specialized authentication application is initiated, which may reside in the USB driver 115 or may reside in the app code 115A. The application generates a screen requesting that the user enter credentials (such as a password) and authenticates the user that inserted the USB device 120.

Assuming the credential entered is authenticated, the USB driver 115B or the application writes the secure key into the secure storage location 115E or into the secure memory 114C.

Once the secure key is written to storage 115E and/or the memory 114C, the USB driver 115B forces a boot cycle on the device 110.

During the boot cycle, the modified OS loader 114B checks to see if the secure memory 114C and/or the secure storage location 115E has the secure key. Assuming the secure key is present, the OS loader 114B loads a specific OS image 115D as the OS 115D from the HD 115 into volatile memory 113 for execution by the processors 111 along with any drivers/app code 115A applicable to the selected and specific OS image 115D.

In an embodiment, the secure key is mapped to a specific OS image 115D, such that different secure keys can be provided by different users having different levels of security.

In an embodiment, the OS loader 114B loads the specific OS image 115D as a version of the OS 115B for which all security restrictions are turned off. This permits the user to modify, add, and delete anything the user desires without encountering an inadequate security message from the OS 115C.

In an embodiment and based on the secure key present, the specific OS image 115D includes all native OS services with a substantial amount or all of the security restrictions turned off.

In an embodiment and based on the secure key present, the specific OS image 115D includes a selected set of OS services with selective security restrictions turned off.

In an embodiment and based on the secure key present, the specific OS image 115D includes a native version of the OS 115C, bypassing any startup software applications, and disabling any user-implemented security settings.

In an embodiment and based on the secure key present, the specific OS image 115D grants full access to making OS 115C including kernel-level modifications.

In an embodiment, the OS loader 114B is customized for a specific type of OS, such as Android®, Windows®, macOS®, Linux®, and others.

The system 100 permits a secure mechanism for booting a device 110 into an OS environment that is equivalent to a safe mode of operation with native OS services being available while security access is enhanced (security restrictions removed) based on a presented security key on the USB device 120. This allows the user full access to the OS 115C without concerns of any corruption that may have been caused by user customizations made to the OS 115C. This allows for improved debugging of perceived issues with the OS 115C and allows for modification to the OS 115C when new functional requirements for the OS 115C are needed by the user.

In an embodiment, the device 110 is a Self-Service Terminal (SST). In an embodiment, the SST is an Automated Teller Machine (ATM). In an embodiment, the SST is a kiosk.

In an embodiment, the device 110 is a Point-Of-Sale (POS) terminal.

In an embodiment, the device 110 is one of: a phone, a tablet, a laptop, a desktop, a server, a wearable processing device, or a device that is part of the Internet-of-Things.

These and other embodiments are now discussed with reference to the FIGS. 2-4.

Figure 2:
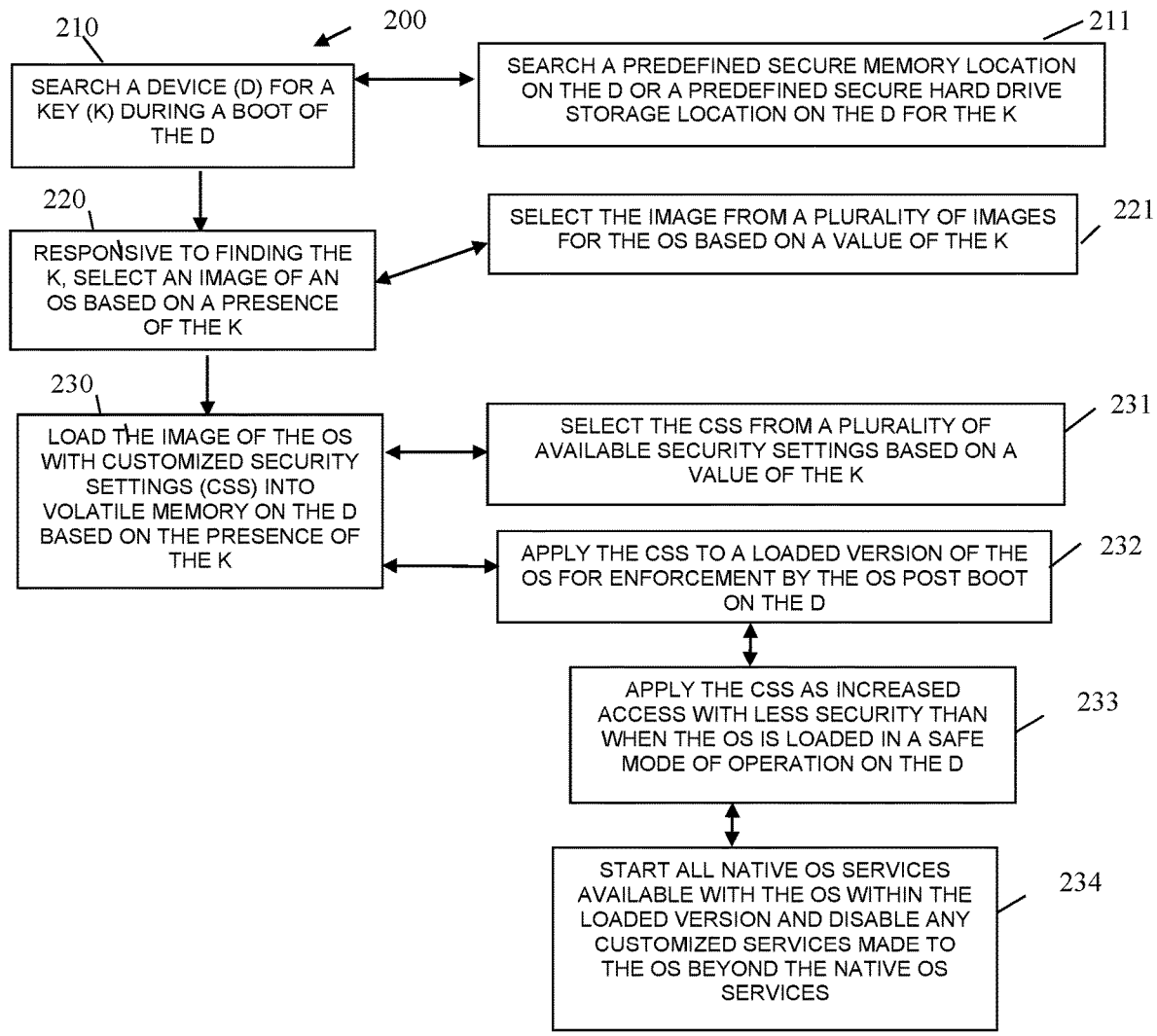
FIG. 2 is a diagram of a method for bypassing OS system security through a secure device, according to an example embodiment.

FIG. 2 is a diagram of a method 200 for bypassing OS system security through a secure device, according to an example embodiment. The software module(s) that implements the method 200 is referred to as an "OS loader." The OS loader is implemented as executable instructions programmed and residing within memory and/or a non-transitory computer-readable (processor-readable) storage medium and executed by one or more processors of a device. The processor(s) of the device that executes the OS loader are specifically configured and programmed to process the OS loader. The OS loader may or may not have access to one or more network connections during its processing. The network connections can be wired, wireless, or a combination of wired and wireless.

In an embodiment, the device that executes the OS loader lacks network connectivity.

In an embodiment, the device that executes the OS loader is the device 110. In an embodiment, the device 110 is one of: a SST, an ATM, a kiosk, a POS terminal, a phone, a laptop, a tablet, a wearable processing device, a desktop computer, a server, and an IoT device.

In an embodiment, the OS loader is the OS loader 114B.

At 210, the OS loader searches a device for a key during a boot of the device. The device is in a boot cycle and the OS loader is called from the boot instructions during the boot. The OS loader when initiated during the boot searches predefined memory and/or hard drive storage locations for a presence of the key.

In an embodiment and as stated above, at 211, the OS loader searches a predefined secure memory location on the device or searches a predefined secure hard drive storage location on the device for the key.

At 220, the OS loader and responsive to finding the key, at 210, selects an image of an OS based on a presence of the key.

In an embodiment, at 221, the OS loader selects the image from a plurality of images for the OS based on a value of the key. In an embodiment, the images of the OS are encrypted on the hard drive of the device.

At 230, the OS loader loads the image of the OS with customized security settings into volatile memory on the device based on the presence of the key.

In an embodiment, at 231, the OS loader selects the customized security settings from a plurality of available security settings based on a value of the key.

In an embodiment, at 232, the OS loader applies the customized security settings to a loaded version of the OS for enforcement by the OS post boot on the device.

In an embodiment of 232 and at 233, the OS loader applies the customized security settings with less security than when the OS is loaded in a safe mode of operation on the device. That is, a conventional safe mode maintains some security settings as to what a user can do with respect to resources of the OS, the resources including services, software code, file system, etc. The customized security settings provide more unfettered access to modifying these resources or at least more access than that which a conventional safe mode of operation would allow.

In an embodiment of 233 and at 234, the OS loader starts all native OS services available with the OS within the loaded version and disables any customized services that were made to the OS beyond the native OS services. That is, users may have added customized services or even customized security settings, the OS loader disables these customizations but at the same time loads and initiates all the native OS services into the OS for post boot access by the user.

Figure 3:
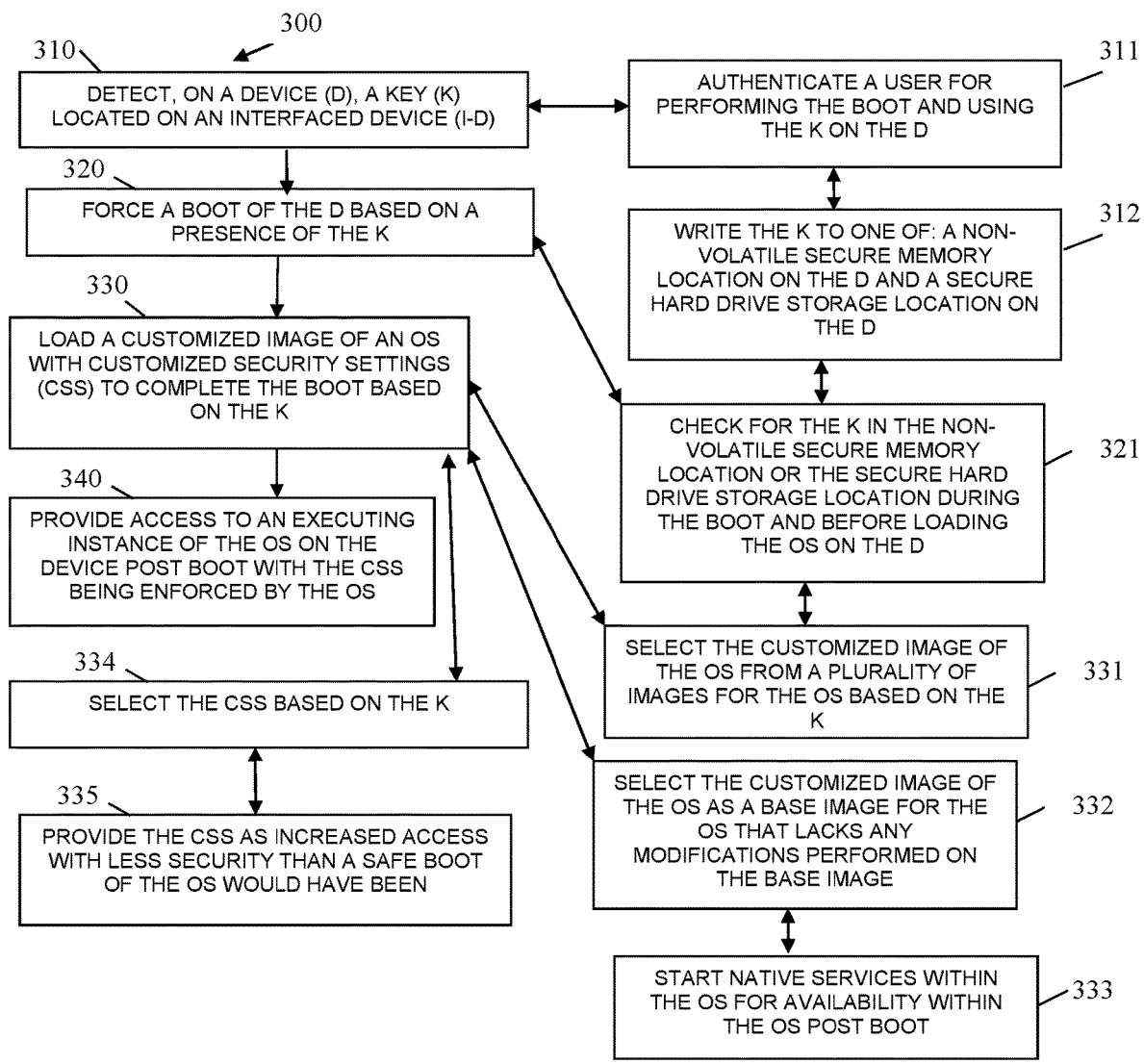
FIG. 3 is a diagram of another method for bypassing OS system security through a secure device, according to an example embodiment.

FIG. 3 is a diagram of another method 300 for bypassing OS system security through a secure device, according to an example embodiment. The software module(s) that implements the method 300 is referred to as an "OS security bypass manager." The OS security bypass manager is implemented as executable instructions programmed and residing within memory and/or a non-transitory computer-readable (processor-readable) storage medium and executed by one or more processors of a device. The processors that execute the OS security bypass manager are specifically configured and programmed to process the OS security bypass manager. The OS security bypass manager may or may not have access to one or more network connections during its processing. The network connections can be wired, wireless, or a combination of wired and wireless.

In an embodiment, the device that executes the OS security bypass manager lacks network connectivity.

In an embodiment, the device that executes the OS security bypass manager is the device 110. In an embodiment, the device 110 is one of: a SST, an ATM, a kiosk, a POS terminal, a phone, a laptop, a tablet, a wearable processing device, a desktop computer, a server, and an IoT device.

In an embodiment, the OS security bypass manager is a combination of the OS loader 114C, the USB driver 115B, and the method 200.

The OS security bypass manager presents another and in some ways enhanced processing perspective of the method 200.

At 310, the OS security bypass manager detects a key located on an interfaced device. Detection occurs upon connection of the interfaced device to the device that executes the OS security bypass manager. When the interfaced device is connected, the corresponding device driver is activated, which is part of the OS security bypass manager, such that the OS security bypass manager can inspect the interfaced device for a key. This was discussed above with the FIG. 1 and is processing relevant to the USB driver 115B and/or application called by the USB driver 115B. It is to be noted that the device can be in any state of operation when the interfaced device is connected to the device and upon connection the OS security bypass manager (USB driver 115B) is initiated.

In an embodiment, at 311, the OS security bypass manager authenticates a user for performing a boot using the detected key on the interfaced device. This too was discussed above with the FIG. 1.

In an embodiment of 311 and at 312, the OS security bypass manager writes the detected key to one of: a non-volatile secure memory location on the device and a secure hard drive storage location on the device. This is done to ensure that when the device is in a boot cycle, the key can be detected.

At 320, the OS security bypass manager forces a boot of the device based on a presence of the key.

In an embodiment of 312 and 320, at 321, the OS security bypass manager checks for the key in the non-volatile secure memory location or the secure hard drive storage location during the boot and before loading the OS on the device.

At 330, the OS security bypass manager loads a customized image of an OS with customized security settings to complete the boot based on the key.

In an embodiment of 321 and 330, at 331, the OS security bypass manager selects the customized image of the OS from a plurality of images for the OS based on a value of the key.

In an embodiment, at 332, the OS security bypass manager selects the customized image of the OS as a base image for the OS that lacks any modifications performed on the base image.

In an embodiment of 332 and at 333, the OS security bypass manager starts native services within the OS for availability within the OS post boot.

In an embodiment, at 334, the OS security bypass manager selects the customized security settings based on a value of the key.

In an embodiment of 334 and at 335, the OS security bypass manager provides the customized security settings as increased access with less security than a traditional safe boot of the OS would have been.

According to an embodiment, at 340, the OS security bypass manager provides access to an executing instance of the OS on the device post boot with the customized security settings being enforced by the OS.

Figure 4:
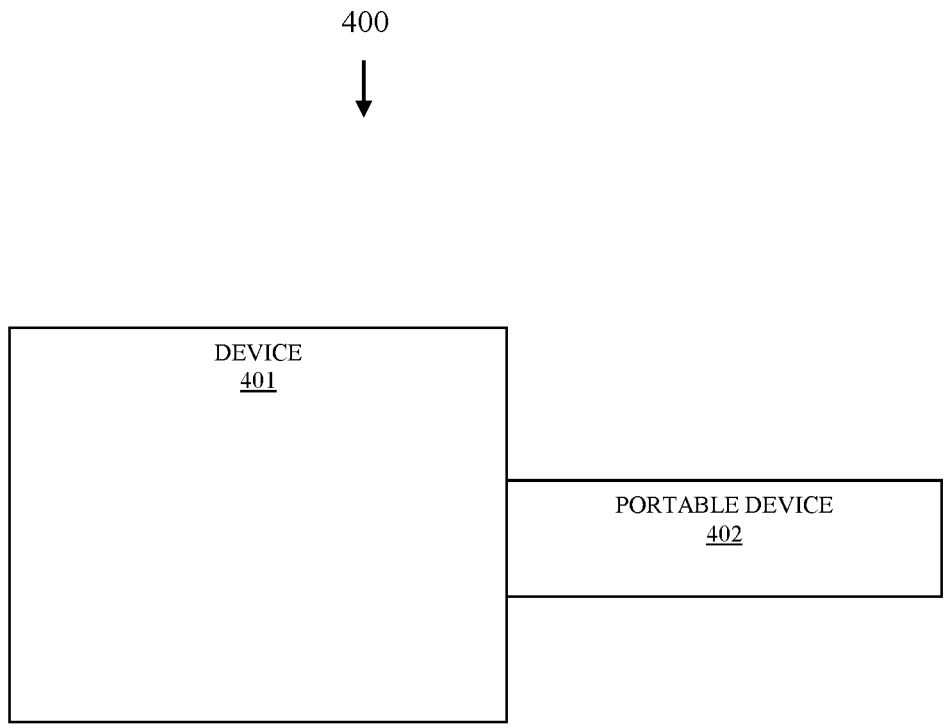
FIG. 4 is a diagram of another system for bypassing OS system security through a secure device, according to an example embodiment.

FIG. 4 is a diagram of a system 400 for bypassing OS system security through a secure device, according to an example embodiment. The system 400 includes a variety of hardware components and software components. The software components of the system 400 are programmed and reside within memory and/or a non-transitory computer-readable medium and execute on one or more processors of the system 400. The system 400 may or may not communicate over one or more networks, which can be wired, wireless, or a combination of wired and wireless.

In an embodiment, the system 400 lacks any network connectivity.

In an embodiment, the system 400 implements, inter alia, the processing described above with the FIGS. 1-3.

The system 400 includes a device 401 and a portable device 402.

In an embodiment, the device 401 is a Self-Service Terminal (SST). In an embodiment, the SST is an ATM. In an embodiment, the SST is a kiosk.

In an embodiment, the device 401 is a Point-Of-Sale (POS) terminal.

In an embodiment, the portable device 402 is a USB device.

The device 401 is configured to: (i) detect a key present on the portable device 402 when the portable device is interfaced to the device 401, (ii) authenticated a user for using the key, (iii) force a boot of the device 401, and (iv) load a customized OS with customized security settings into volatile memory of the OS for execution on the device 401 based on a value for the key to complete the boot.

In an embodiment, the device 401 is further configured in (ii) to write the key to one of: a secure memory location and a secure hard drive storage location for detection during the boot of the device 401.

In an embodiment, the device 401 is configured to perform the processing discussed above with the FIG. 1 and the methods 200 and 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    detecting, on a device, a key located on an interfaced device, wherein detecting further includes detecting the key when the device is in a normal operational state and not associated with any boot process while the device is fully accessible to a user;
    forcing a boot of the device based on a presence of the key;
    loading, by an Operating System (OS) loader of the device, a customized image of an OS with custom security settings to complete the boot based on the key; and
    processing, on the device, the detecting, the forcing, and the loading while the device lacks network connectivity.

2. The method of claim 1, wherein detecting further includes authenticating the user for performing the boot and using the key on the device.

3. The method of claim 2, wherein authenticating further includes writing the key to one of:
    a non-volatile secure memory location on the device and a secure hard drive storage location on the device.

4. The method of claim 3, wherein forcing further includes checking for the key in the non-volatile secure memory location or the secure hard drive storage location during the boot and before loading of the OS on the device.

5. The method of claim 4, wherein loading further includes selecting the customized image of the OS from a plurality of images for the OS based on the key.

6. The method of claim 1, wherein loading further includes selecting the customized image of the OS as a base image for the OS.

7. The method of claim 6, wherein loading further includes starting native services within the OS for availability within the OS post boot.

8. The method of claim 1, wherein loading further includes selecting the customized security settings based on the key.

9. The method of claim 8, wherein selecting further includes providing the customized security settings as increased access from what is available during a safe boot of the OS.

10. The method of claim 1 further comprising, providing access to an executing instance of the OS on the device post boot with the customized security settings being enforced by the OS.

11. A system, comprising:
    a device; and
    a portable device;
    wherein the device is configured to: (i) detect a key present on the portable device when the portable device is interfaced to the device when the device is in a normal operational state and not associated with any boot process while the device is fully accessible to a user, (ii) authenticat the user for using the key, (iii) force a boot of the device, and (iv) load, by an Operating System (OS) loader of the device, a customized OS with customized security settings into volatile memory of the OS for execution on the device based on a value for the key to complete the boot, wherein (i), (ii), (iii), and (iv) are processed by the device while the device lacks network connectivity.

12. The system of claim 11, wherein the portable device is a Universal Serial Bus (USB) device, and wherein the device is one of: a Self-Service Terminal (SST), an Automated Teller Machine (ATM), a kiosk, and a Point-of-Sale (POS) terminal.

13. The system of claim 11, wherein the device is further configured, in (ii), to: write the key to one of: a secure memory location and a secure hard drive storage location for detection during the boot of the device.

* * * * *